United States Patent [19]
Watanabe

[11] Patent Number: 5,383,789
[45] Date of Patent: Jan. 24, 1995

[54] MULTI-FULCRUM CARD EJECTING MECHANISM

[75] Inventor: Yoshinori Watanabe, Yamato, Japan

[73] Assignee: Molex Incorporated, Ill.

[21] Appl. No.: 166,765

[22] Filed: Dec. 14, 1993

[30] Foreign Application Priority Data

Jan. 21, 1993 [JP] Japan .................... 5-026289

[51] Int. Cl.⁶ .................... H01R 13/629
[52] U.S. Cl. .................... 439/159; 361/754
[58] Field of Search .......... 439/159, 152, 160; 361/754; 360/99.02, 99.06

[56] References Cited

U.S. PATENT DOCUMENTS 4,975,805 12/1990 Schmutzler .................... 361/399
5,304,070 4/1994 Bertho et al. .................... 439/159 X Primary Examiner—P. Austin Bradley
Assistant Examiner—Jeanne M. Elpel
Attorney, Agent, or Firm—Stacey E. Caldwell

[57] ABSTRACT

An improved IC card ejecting mechanism including an ejecting lever that turns about two fulcrums, one after another, to eject an IC card from an underlying connector apparatus. Specifically, the ejecting lever first turns about a first fulcrum which is placed close to an ejecting end of the lever to provide a relatively large moment arm and to permit disengagement and initial ejection of the card with a relatively small applied force. The ejecting lever then turns about a second fulcrum which is placed close to the opposite end of the ejecting lever to increase the distance of travel of one end of the card outside a card opening.

25 Claims, 11 Drawing Sheets

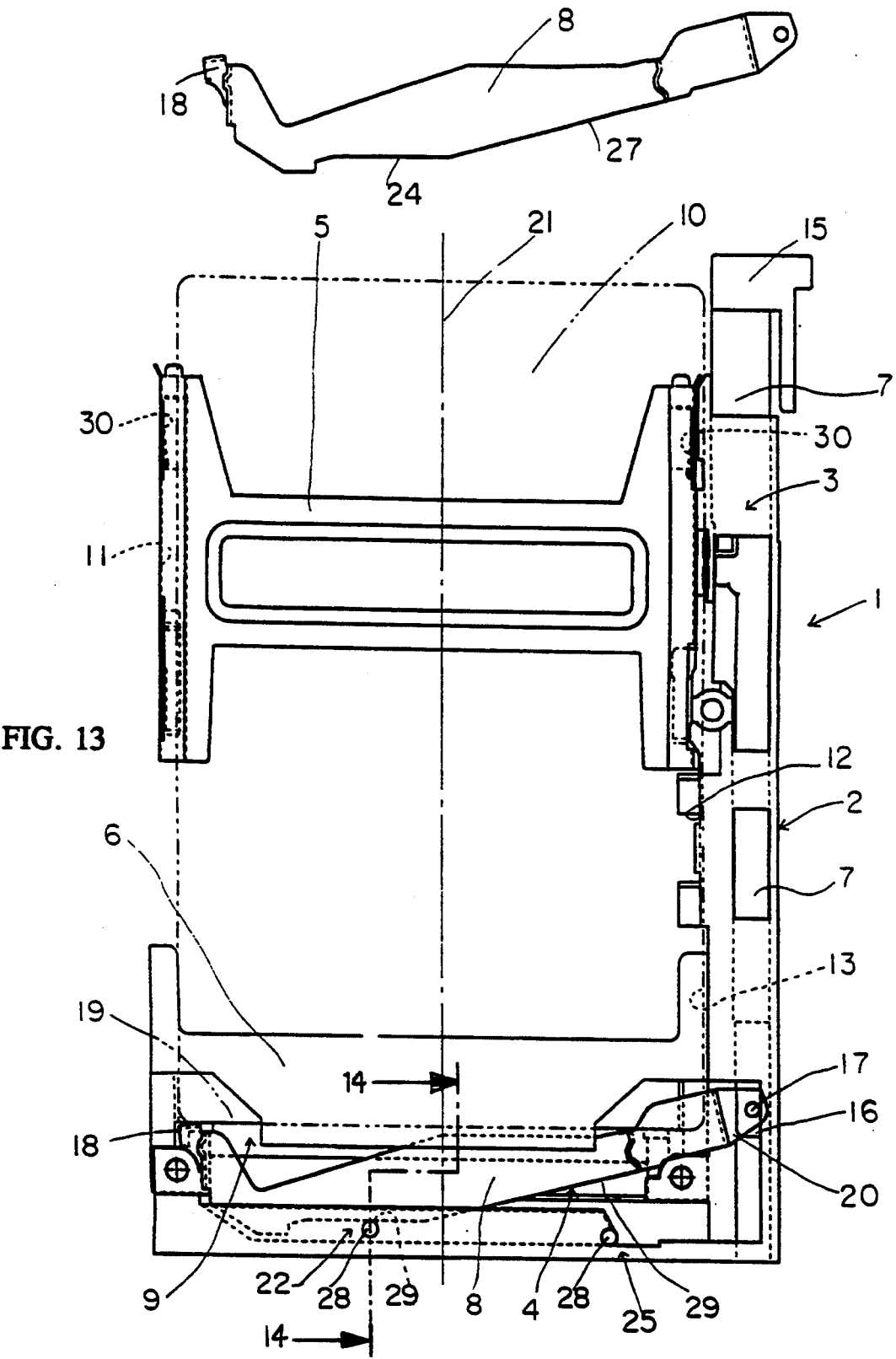

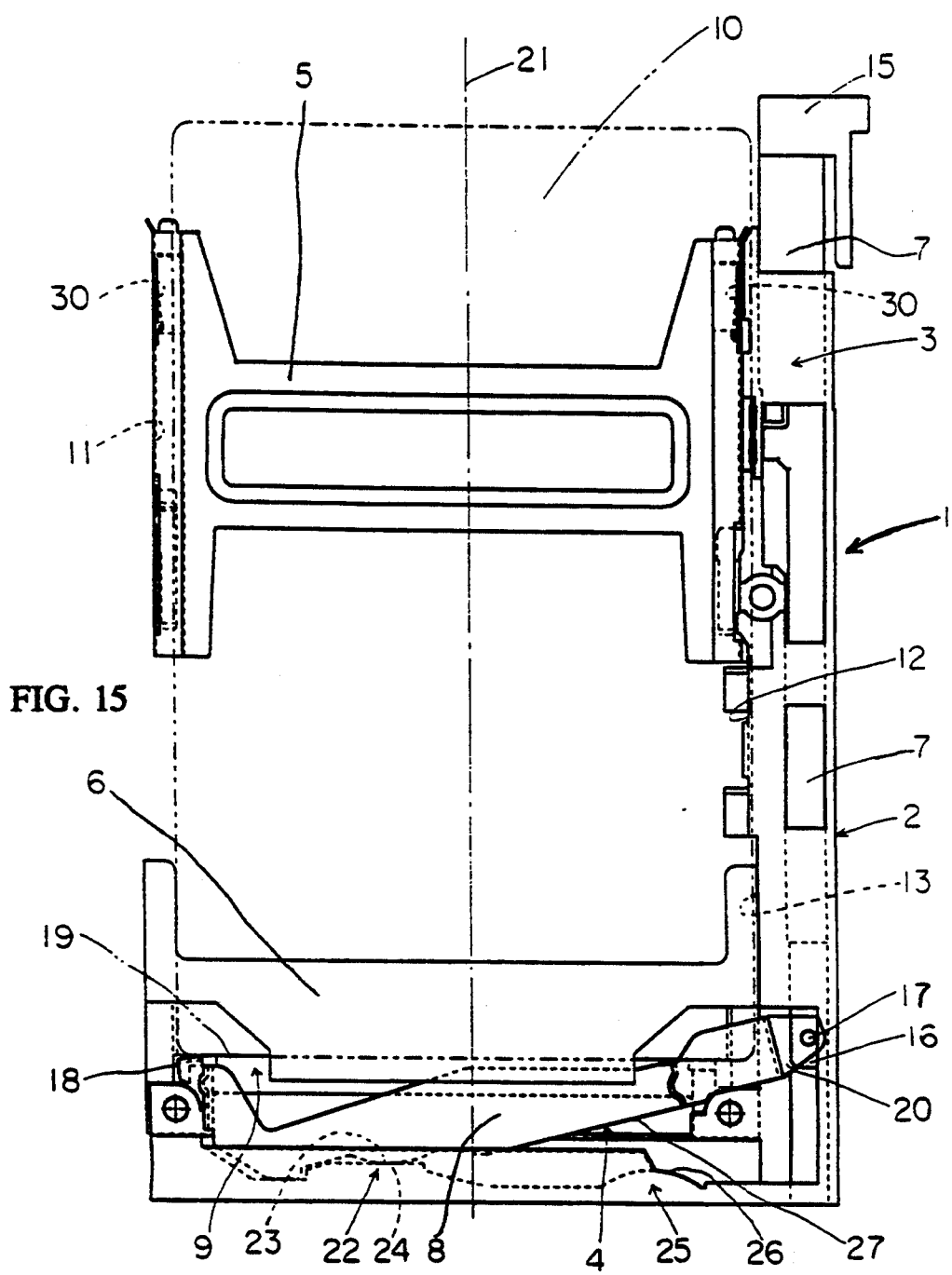

MULTI-FULCRUM CARD EJECTING MECHANISM

FIELD OF THE INVENTION

The present invention relates to a card ejecting mechanism in an IC memory card connector, which functions to disconnect and eject an IC memory card from the connecting pins of the IC memory card connector.

DESCRIPTION OF PRIOR ART

IC memory card connectors are often equipped with ejecting mechanisms for disconnecting and ejecting IC cards therefrom. Ordinary card ejecting mechanisms use an ejecting lever operatively connected to one end of an elongated operating rod or push rod for pivoting about a fulcrum to eject an IC card from a card connector upon actuation of the operating rod. Japanese Utility Model application No. 4-78,035 assigned to the applicant discloses a card ejecting mechanism of such a type. The card ejecting mechanism disclosed in the application comprises an operating rod and a card-ejecting lever responsive to the actuation of the operating rod by pivoting about a fulcrum to permit a pushing end of the ejecting lever to disconnect and eject the IC memory card from the memory card connector. The operating rod is placed on a first side of a longitudinal centerline of the IC memory card connector, and the ejecting lever extends laterally from one side of the longitudinal centerline of the connector to the other, with the pushing end of the ejecting lever and the fulcrum both being on the opposite side of the longitudinal centerline of the connector from the operating rod.

The pushing end of the ejecting lever and the fulcrum are on the second side of the longitudinal centerline of the IC memory card connector, while the joint end of the ejecting lever is on the first side of the longitudinal centerline of the card connector. Such an arrangement yields a greater joint-to-fulcrum distance than pushing end-to-fulcrum distance, resulting in a relatively large moment arm and increased leverage of the ejecting lever, thereby facilitating ejection of the IC memory card from the card connector, i.e. disconnecting and ejecting the card with a relatively small force applied to the operating rod.

The arrangement of such a relatively large moment arm, however, limits the distance of travel of the IC memory card away from the card connector upon ejection.

SUMMARY OF THE INVENTION

One object of the present invention is to provide an improvement to a card ejecting mechanism in an IC memory card connector of the type disclosed in Japanese Utility Model Application No. 4-78,035. The invention is directed to increasing the distance of travel of the IC memory card away from the card connector during ejection, while still retaining the relatively large moment arm and resulting leverage of the prior card eject mechanism.

To achieve this objective, an IC memory card connector is equipped with a multi-fulcrum card ejecting mechanism. The multi-fulcrum card ejecting mechanism comprises an operating rod and an ejecting lever. The ejecting lever is responsive to the actuation of the operating rod by pivoting about a plurality of fulcrums on the card connector to cause one end of the ejecting lever to disconnect and eject the card from the connector. The plurality of fulcrums are arranged so as to permit the ejecting lever to turn about the plurality of fulcrums one after another.

The principle of the multi-fulcrum card ejecting mechanism according to the present invention is thus described as:

The card pushing end-to-fulcrum distance "X" of the ejecting lever must be smaller than the joint-to-fulcrum distance "Y" of the ejecting lever so, as to provide a relatively large moment arm and thereby maximize the leverage of the lever. Conversely, the car,3 pushing end-to-fulcrum distance "X" must be larger than the joint-to-fulcrum distance "Y" so as to increase the distance of travel of the card from the card connector.

To solve this apparent contradiction in fulcrum requirements, a card ejecting mechanism of the present invention uses an ejecting lever which pivots about two or more fulcrums, one after another. Specifically, first the ejecting lever pivots about the first fulcrum which is located close to the card pushing end of the ejecting lever to meet the requirement $X<Y$ for maximizing the moment arm and increasing the leverage of the lever. Then, the ejecting lever pivots about the second fulcrum which is placed close to the joint between the ejecting lever and the operating rod to meet the requirement $X>Y$ for increasing the distance of travel of the card from the card connector.

BRIEF DESCRIPTION OF THE DRAWINGS

Other objects and advantages of the present invention will be understood from the following description of card ejecting mechanisms according to preferred embodiments of the present invention, which are shown in accompanying drawings:

FIG. 12 is a plan view of an ejecting lever used in the card ejecting mechanism of FIG. 10;

FIG. 13 is a plan view of a card ejecting mechanism according to a third embodiment of the invention showing an IC card inserted in a card connector and connected to the header portion thereof;

FIG. 14 is a cross-section view taken generally along the line 14—14 in FIG. 13;

FIG. 15 is a plan view of a card ejecting mechanism according to a fourth embodiment of the invention, showing an IC card inserted in a card connector and connected to the header portion thereof;

DETAILED DESCRIPTION OF THE PREFERRED EMBODIMENT

Figure 1:
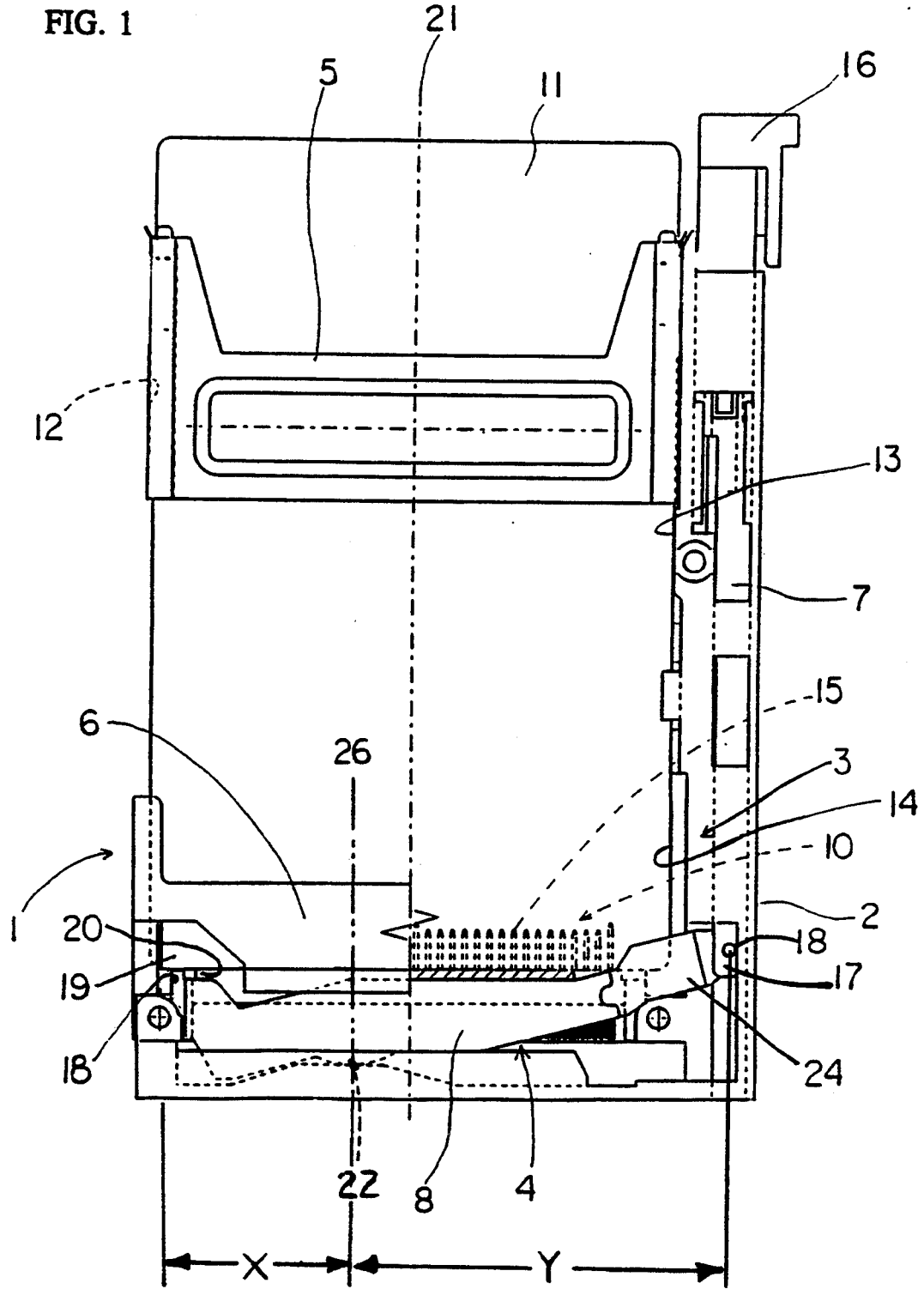
FIG. 1 is a plan view of a card ejecting mechanism according to the prior art.

FIG. 1 shows a card ejecting mechanism of the type disclosed in Japan Utility Model Application No. 4-78,035. The ejecting mechanism of that design comprises an operating rod 7 and a card-ejecting lever 8 responsive to the actuation of the operating rod by pivoting about a fulcrum to permit a pushing end 18 of the ejecting lever to disconnect and eject the IC memory card from a card connector, generally designated 1. In this case, the pushing end of the ejecting lever 18 and the fulcrum 22 are on one side of the longitudinal centerline of the IC memory card connector, and the joint or rod end of the ejecting lever is on the other side of the centerline of the card connector. Such an arrangement yields a greater joint-to-fulcrum distance "X" than pushing end-to-fulcrum distance "Y" resulting in a relatively large moment arm and increased leverage of the ejecting lever, thereby facilitating ejection of the IC memory card from the card connector.

Figure 2:
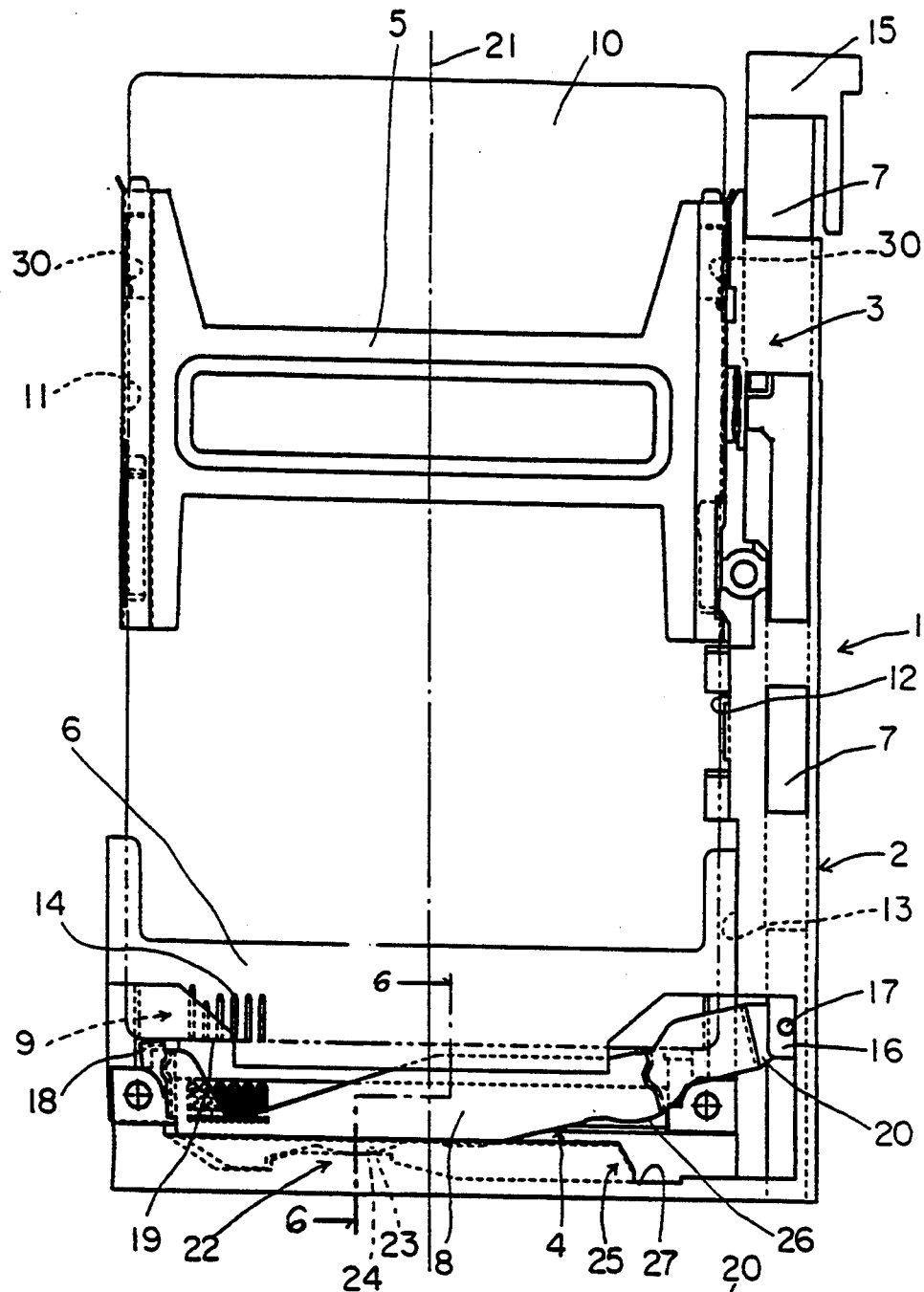
FIG. 2 is a plan view of a card ejecting mechanism according to a first embodiment, showing an IC card inserted in a card connector and fully connected to the header portion thereof.
Figure 3:
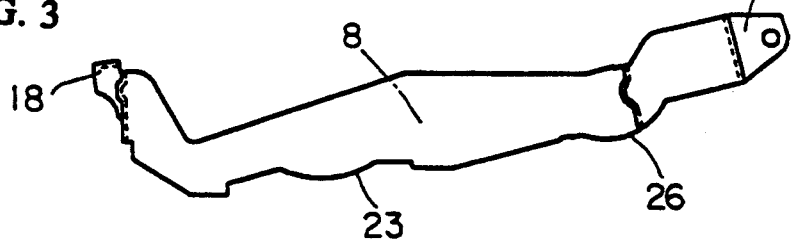
FIG. 3 is a plan view of an ejecting lever.

Turning now to applicant's invention, FIGS. 2 through 9 show an IC memory card connector 1 equipped with a card ejecting mechanism according to a first embodiment of the invention. Referring first to FIGS. 2 and 3, the card connector comprises a body 2 which includes a rod-containing section 3 and a lever-containing section 4 lying at one end of the body 2 and extending perpendicular to the rod-containing section 3. The connector also includes an initial insertion guide 5 at a proximal or insertion end of the connector, and a secondary insertion guide 6 proximate the distal end of the card connector near the lever-containing section 4.

The connector is equipped with an ejecting mechanism for disconnecting and ejecting an IC memory card 10 from the connector. The ejecting mechanism comprises an operating rod 7 movably mounted within the rod-containing section 3, and an ejecting lever 8 pivotally mounted within the ejecting lever-containing section 4. A header portion 9 is disposed generally below the ejecting lever 8, and includes connector pins 14, adapted to make an electrical connection with the conductors of the IC memory card 10 when the card 10 is fully inserted in the body 2 of the connector. In a preferred embodiment of the invention, the connector body and operating rod are fabricated of dielectric material. The insertion guides and ejecting lever can also be molded of plastic, but preferably the initial insertion guide and ejecting lever are fabricated of stamped and formed sheet metal material to alleviate wear and to allow for grounding functions, as described below.

Specifically the card 10 is adapted to be received in a passage defined by opposite inner sides 11 of the initial insertion guide 5, a longitudinal side wall 12 of the rod-containing section 3, and opposite inner sides 13 of the secondary insertion guide 6.

The operating rod 7 has a push-button 15 at its proximal or actuating end, and a joint end 20 of the ejecting lever 8 is connected to the opposite end 16 of the operating rod 7 by a joint pin 17. A pushing projection 18 is formed on the other end of the ejecting lever 8, and the pushing projection 18 faces a leading edge 19 of the IC memory card 10, when the card is fully inserted within the card body 2.

Card connector 1 has a longitudinal centerline 21 which is generally coincident with a longitudinal centerline of the IC memory card 10, and of the header portion 9. The operating rod 7 is located on a first side of the centerline 21 of the card connector, i.e. the right side as shown in FIG. 2, and the ejecting lever 8 extends across the centerline 21 of the card connector, so that the pushing projection 18 of ejecting lever is located on the opposite side of the centerline 21 from the operating rod 7.

A plurality of fulcrums about which the ejecting lever 8 turns are formed intermediate the pushing projection 18 and the joint end 20 of the ejecting lever 8. In the first embodiment there are two fulcrums 22 and 25. These fulcrums are in the form of surfaces or points on the card body 2 on which the ejecting lever is supported. The first fulcrum 22 is located on the same side of the centerline 21 of the connector as the pushing projection 18, or on the opposite side from operating rod 7, and the second fulcrum 25 is located on the opposite side from the first fulcrum, i.e. the same side as the operating rod 7.

The first fulcrum 22 comprises a first arc-shaped cam surface 23 formed on the ejecting lever 8 and a first, generally flat, counter-bearing surface 24 formed on an opposing surface of the card body 2. Upon initial actuation of the operating rod 7, the ejecting lever 8 turns about the first fulcrum 22, allowing the point at which the first arc-shaped cam surface 23 abuts the first counter bearing surface 24 to shift continuously and therefore pivot smoothly. The second fulcrum 25 is composed of a second arc-shaped cam surface 26 formed on the ejecting lever 8 and a second, generally flat, counter-bearing surface 27 formed on the opposing surface of the card body 2.

Figure 4:
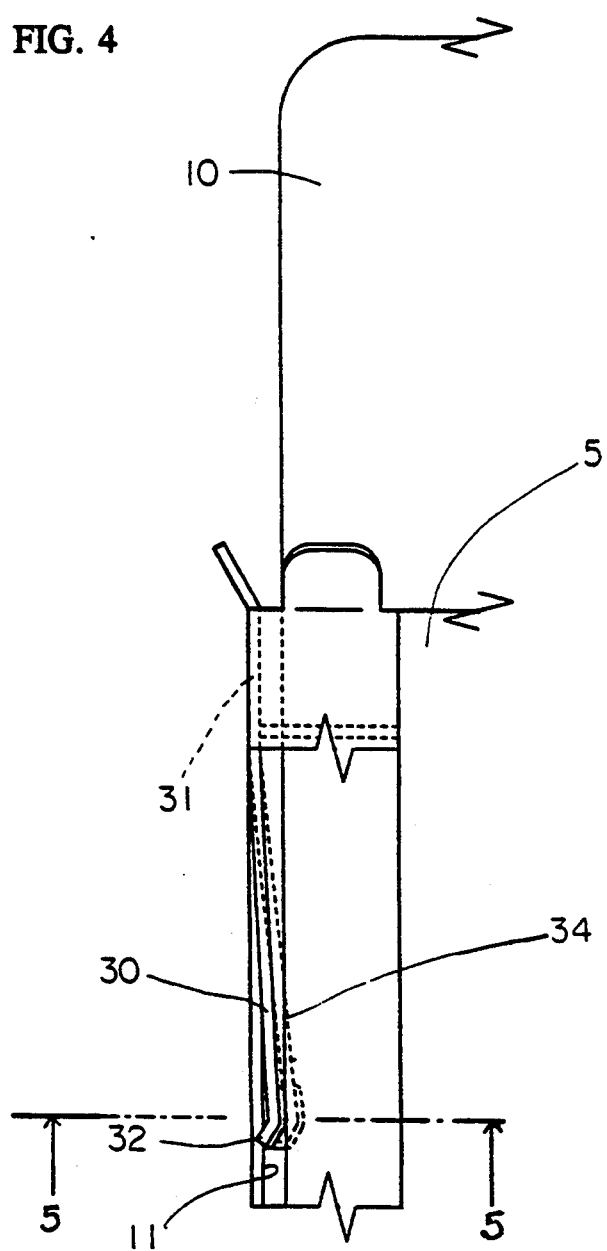
FIG. 4 is a plan view of a fragment of the card, showing a side spring finger attached to one side of the card connector.
Figure 5:
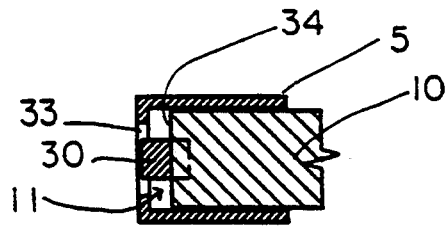
FIG. 5 is an end view taken along the line 5—5 in FIG. 4.

Referring now to FIGS. 4 and 5, two resilient spring fingers 30 are formed in opposing side walls 11 of the initial insertion guide 5. Specifically, the fixed ends 31 of spring fingers 30 are fixed to the side wall 11 proximate the opening of the IC card passage. The free ends 32 of spring fingers 30 extend inwardly, thereby correspondingly biasing an inserted IC memory card 10 inwardly toward the center of the passage. As best seen in FIG. 5, a longitudinal slot 33 is made in the side wall of the insertion guide 5 to permit the spring finger 30 to be yieldingly bent inwardly. In the preferred embodiment, these opposing spring fingers 30 are used as ground terminals to permit the discharge of static electricity.

Figures 6, 7:
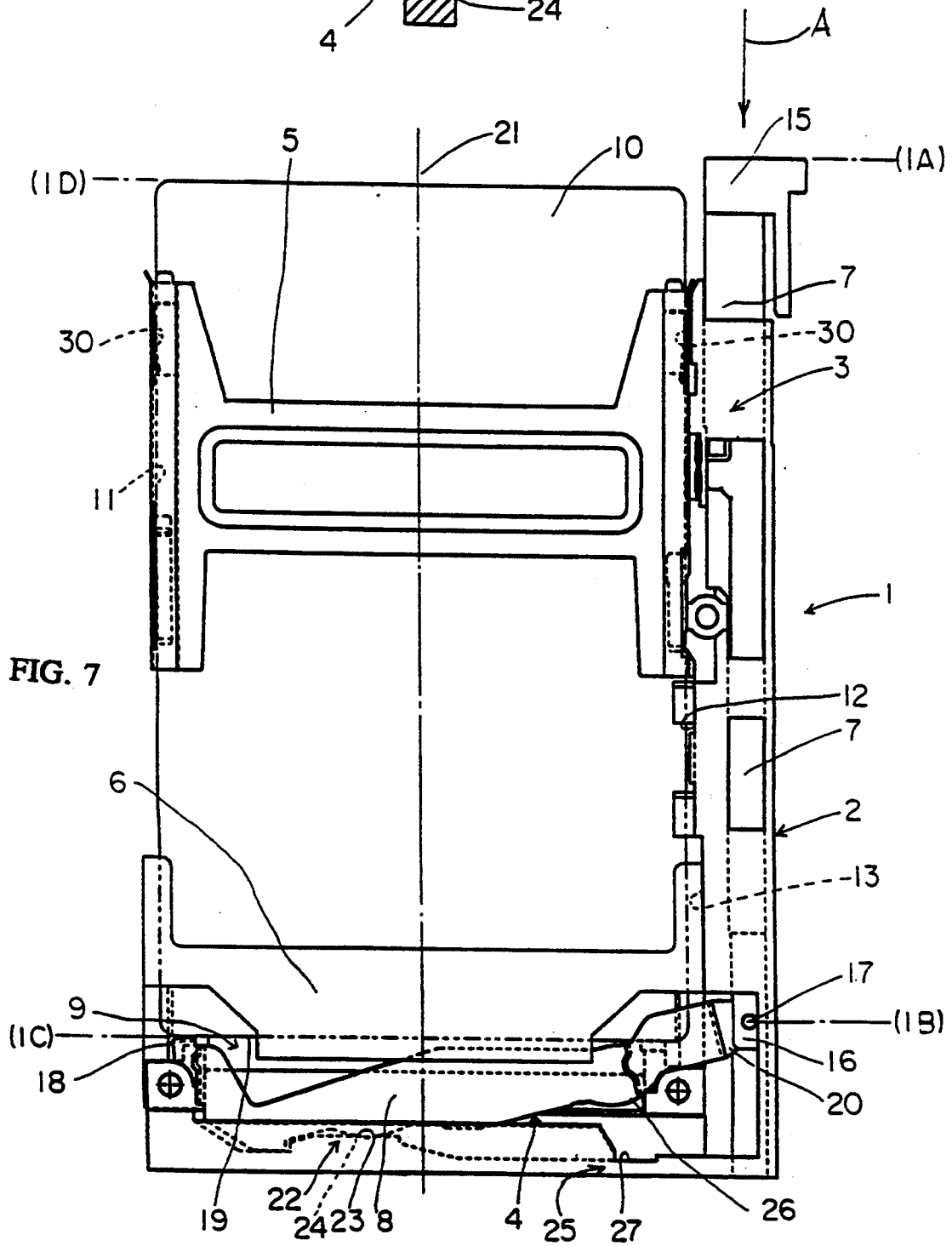
FIG. 6 is an end view taken along the line 6—6 in FIG. 2.
FIG. 7 is a plan view of the card ejecting mechanism, showing that the IC card is inserted in a card connector and is connected to the header portion of the card when the operating rod is not actuated.
Figure 8:
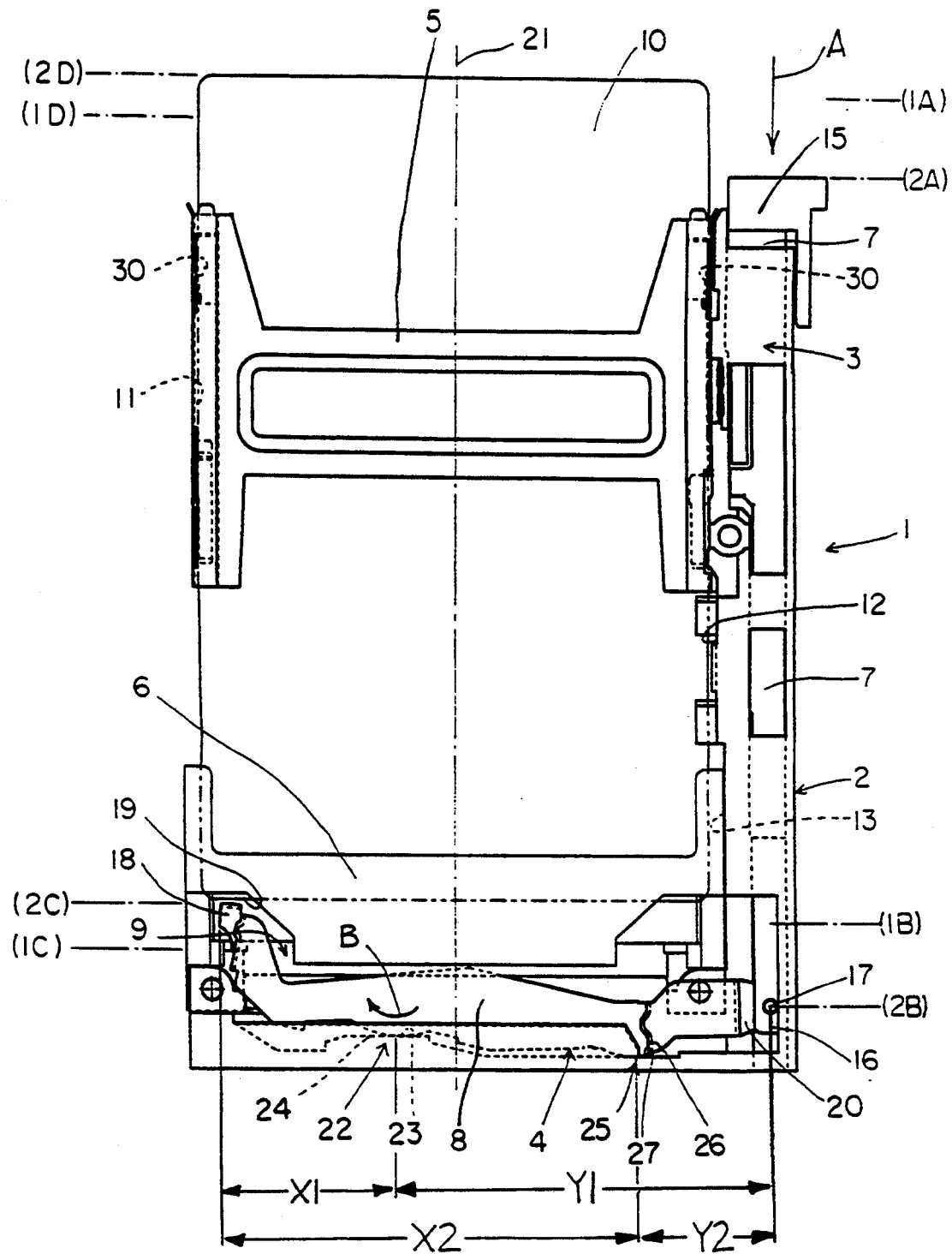
FIG. 8 is a plan view of the card ejecting mechanism showing how it works in response to the initial actuation of the operating rod, causing the ejecting lever to turn about the first fulcrum.
Figure 9:
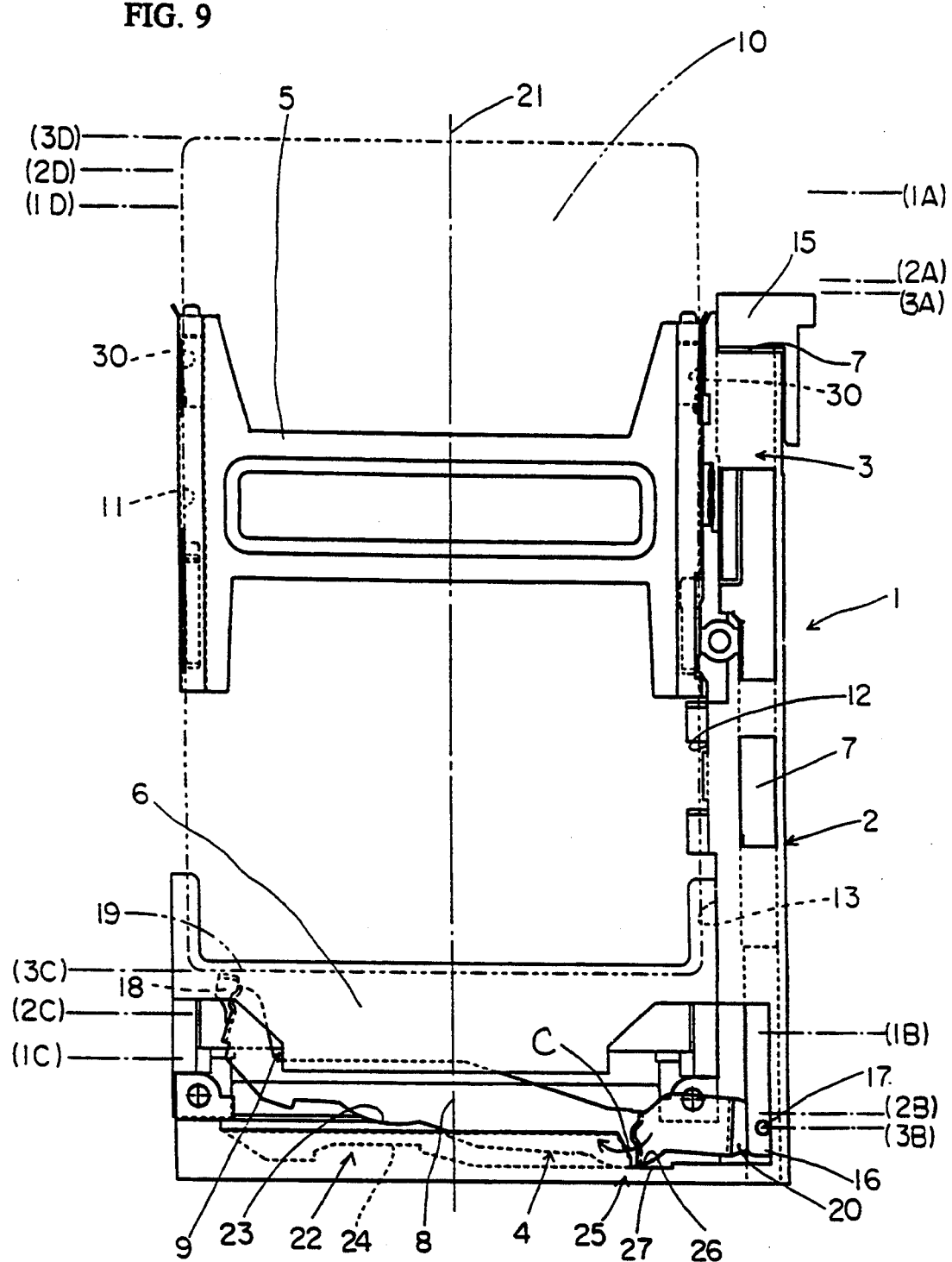
FIG. 9 is a plan view of the card ejecting mechanism, showing how it works in response to further actuation of the operating rod, causing the ejecting lever to turn about the second fulcrum.

Referring now to FIGS. 7 through 9, an IC memory card is ejected from the card connector as described hereinafter. FIG. 7 shows an IC card fully inserted in the card connector and electrically connected to the header portion 9 thereof. The push-button 15 of the operating rod 7 remains in a first, unactuated position 1A, and the pushing projection 18 of the ejecting lever 8 remains in a first, unactuated position 1C, wherein the first cam surface 23 of the ejecting lever 8 is in contact with the first counter bearing surface 24 (FIG. 5), and the second cam surface 26 of the ejecting lever 8 is not in contact with the second counter bearing surface 27.

Ejecting the IC card is commenced by actuating, or pushing in, the push-button 15 of the operating rod 7 in the direction of arrow A (FIG. 7). The movement of the push-button from the unactuated position 1A to the fully ejected position 3A is performed continuously by a single pushing action. However, in describing the operation, there is an intermediate position 2A between the unactuated position and the fully ejected position. First, the movement from the unactuated position 1A to the intermediate position 2A will be described, and second, the movement from the intermediate position 2A to the fully ejected position 3A will be described.

When the push-button 15 of the operating rod is moved from the unactuated position 1A to the intermediate position 2A, the joint pin 17 moves from its unactuated position 1B to its intermediate position 2B, thereby causing the ejecting lever 8 to turn about the first fulcrum 22 in the direction of arrow B (FIG. 8). Then, the second cam surface 26 of the second fulcrum 25 comes in contact with the second counter bearing surface 27, and, at the same time, the pushing projection 18 moves from its unactuated position 1C to its intermediate position 2C to eject the IC memory card 10, thereby at least partially disengaging the conductors of the IC memory card 10 from the pins 14 of the header portion 9, i.e. overcoming the frictional forces between the header pins and the IC card conductors. Thus, the IC memory card 10 is ejected to the intermediate position 2D.

In the movement to the intermediate position, a relatively long distance stroke of the operating rod 3 from the unactuated position 1A to the intermediate position 2A causes the ejecting lever 8 to turn in the direction of arrow B about the first fulcrum 22, providing a relatively long moment arm and increased leverage, thereby disconnecting the conductors (not shown) of the IC memory card 10 from the pins 14 of the header portion 9 with a relatively small force.

When the push-button 15 of the operating rod is then moved from the intermediate position 2A to the fully ejected position 3A, in the direction of arrow A (FIG. 8), the joint pin 17 moves from its intermediate position 2B to its fully ejected position 3B, thereby causing the ejecting lever 8 to turn about the second fulcrum 25 in the direction of arrow C (FIG. 9). At this point, the first cam surface 23 of the first fulcrum 22 is Dot in contact with the first counter bearing surface 24. As a result, the pushing projection 18 moves from its intermediate position 2C to its fully ejected position 3C to eject and carry the IC memory card 10 to its final ejected position 3D. Thus, ejection is completed, and a portion of the IC memory card extends sufficiently outside the opening of the first insertion guide 5 to allow it to be grasped by a user.

In the movement to the final ejected position, a relatively short distance stroke of the operating rod 3 from the intermediate position 2A to the fully ejected position 3A causes the ejecting lever 8 to turn in the direction of arrow C about the second fulcrum 25, thereby moving the IC memory card 10 away from the header section 9. More specifically, the pivoting of the ejecting lever 8 about the second fulcrum 25 causes the IC memory card to travel a greater distance than if the electing lever pivoted only about the first fulcrum.

The mechanical description of the two-step ejecting operation described above is as follows:

(1) The pushing projection-to-fulcrum distance ("X") of the ejecting lever 8 must be smaller than the joint-to-fulcrum distance ("Y") of the ejecting lever 8 so as to provide a relatively large moment arm and initially disconnect and eject an IC memory card 10 from the header portion 9 with a relatively small force ("X"<"Y"); and (2) the pushing projection to fulcrum distance ("X") must be larger than the joint-to-fulcrum distance ("Y") so as to increase the distance of travel of the IC memory card away from the connector with a relatively short stroke of the operating rod 7 ("X">"Y").

Looking again to FIG. 8, these opposing requirements, met by applicant's invention, are illustrated. As described above, the ejecting lever 8 turns about the first and second fulcrums 22 and 25 one after another, wherein the first fulcrum 22 is placed closer to the pushing projection of the ejecting lever to meet the first requirement (X1<Y1), and the second fulcrum 25 is placed closer to the joint of the ejecting lever to meet the second requirement (X2>Y2).

With this arrangement, the IC memory card can be ejected a sufficient distance to permit a user to easily grasp the card by his or her fingers. In addition, the resilient spring fingers 30 on the opposing side walls of the insertion guide 5 limit the ejecting distance of the IC memory card 10 from the card holder. Again referring to FIG. 4, the resilient spring fingers 30 apply a force to opposite sides 34 of the card 10. Therefore, the card ejection, i.e. the distance of travel of the card, can be controlled by adjusting the resilient force of the spring fingers 30.

Figure 10:
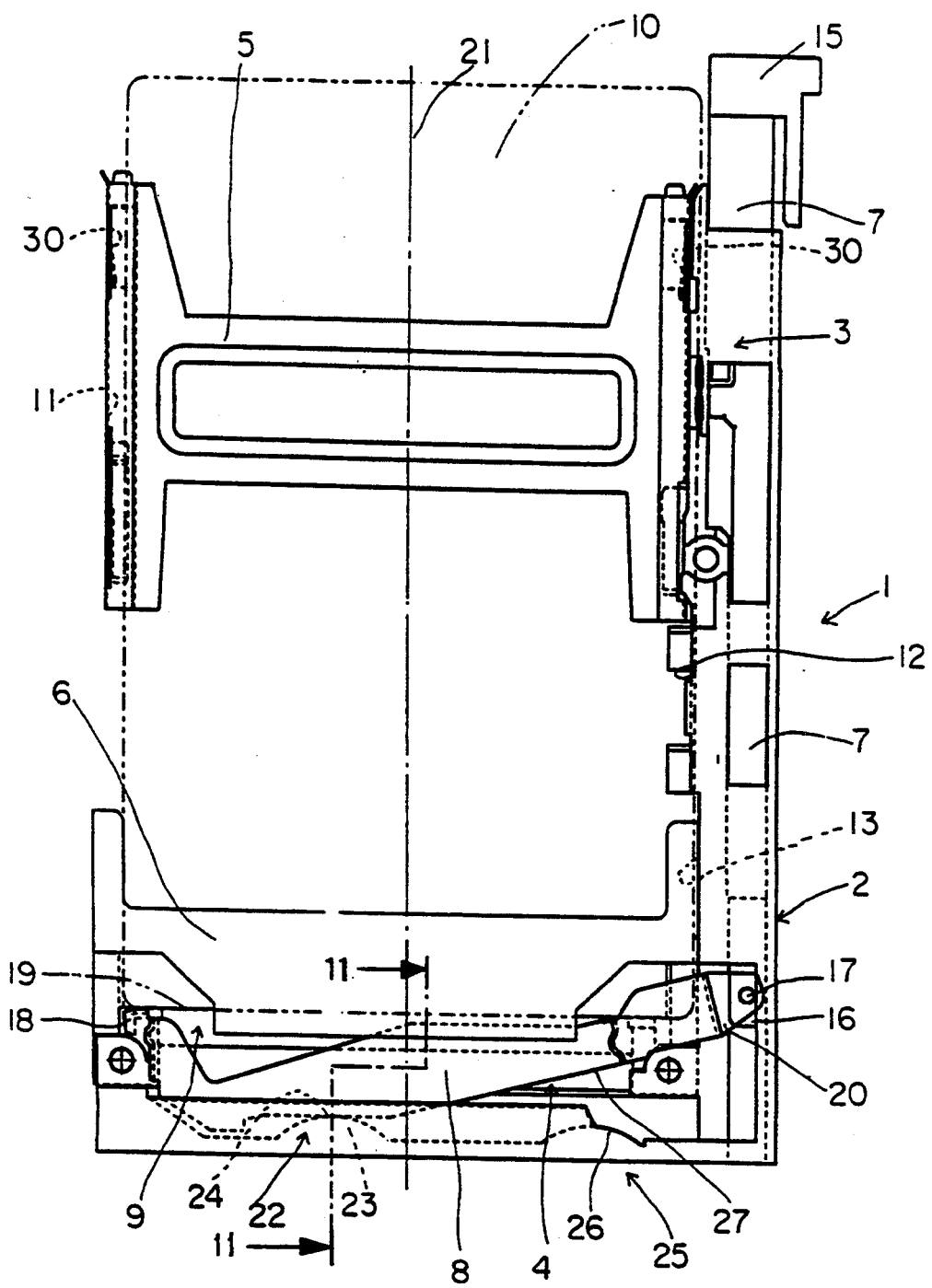
FIG. 10 is a plan view of a card ejecting mechanism according to a second embodiment of the invention, showing an IC card inserted in a card connector and connected to the header portion thereof.
Figure 11:
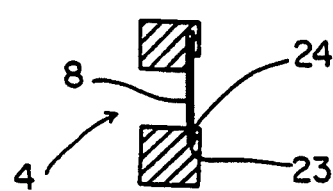
FIG. 11 is a cross-section taken generally along the line 11—11 in FIG. 10.

FIGS. 10, 11 and 12 show a second embodiment of the present invention using first and second fulcrums 22 and 25 which differ from those in the first embodiment in shape. In this embodiment, the first and second curved cam surfaces 23 and 26 of the first and second fulcrums 22 and 25 are formed on the opposing surface of the card body whereas the first and second counter bearing surfaces 24 and 27 of the first and second fulcrums 22 and 25 are formed on the ejecting lever 8.

FIGS. 13 and 14 show a third embodiment of the present invention using the circular surfaces of pins 28 as the first and second curved cam surfaces of the first and second fulcrums 22 and 25. Selected flat areas 29 of the ejecting lever 8 are used as counter bearing surfaces.

FIG. 15 shows a fourth embodiment of the present invention. In this embodiment the first fulcrum 22 comprises a first cam surface 23 on the ejecting lever 8 and a first counter bearing surface 24 of an opposing surface of the connector body, whereas the second fulcrum 25 comprises a second cam surface 26 of the opposing surface of the connector body, and a second counter bearing surface 27 on the ejecting lever 8.

Figure 16:
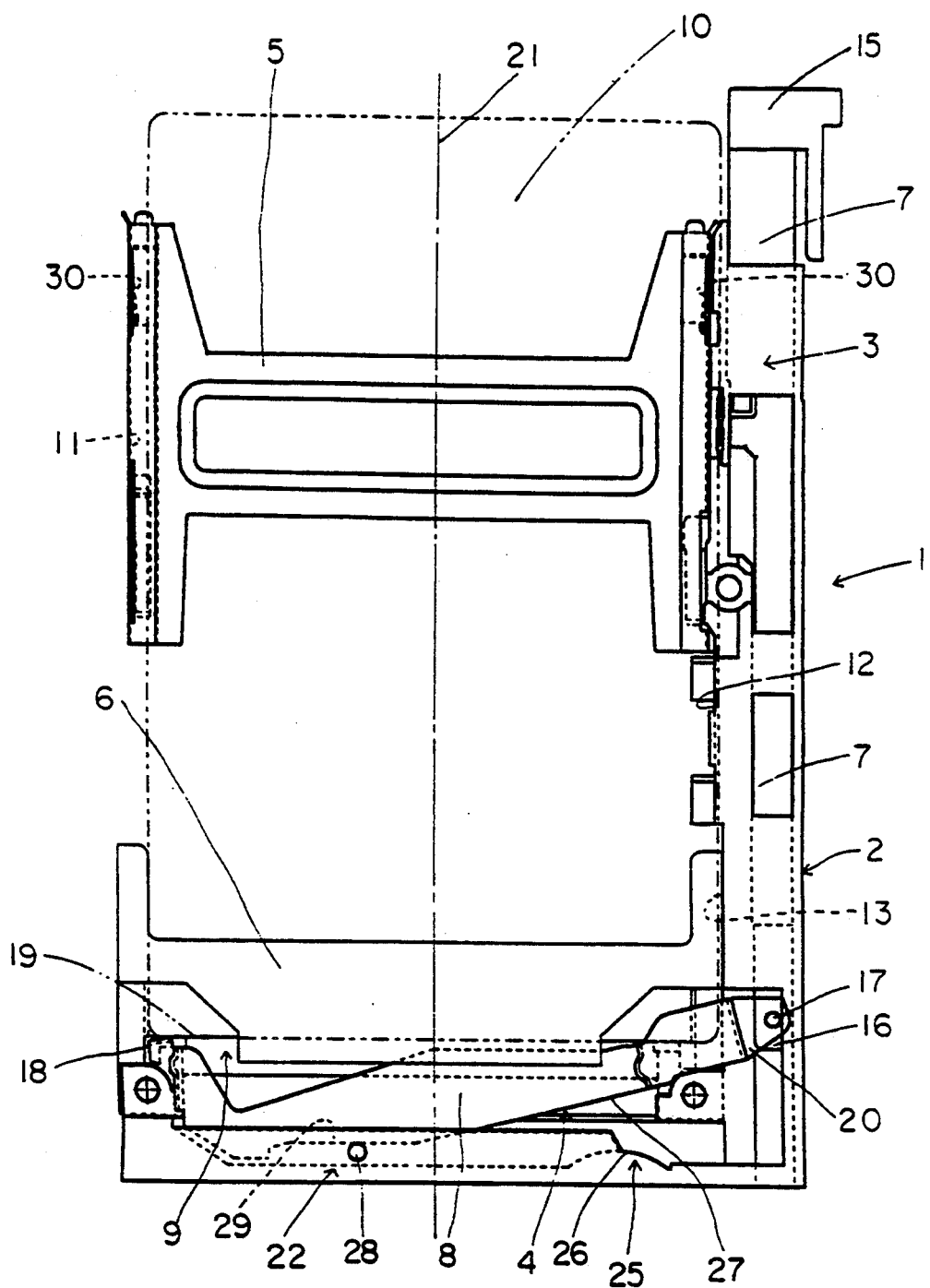
FIG. 16 is a plan view of a card ejecting mechanism according to a fifth embodiment of the invention, showing an IC card inserted in a card connector and connected to the header portion thereof.

FIG. 16 shows a fifth embodiment of the present invention. In this embodiment, the first fulcrum 22 comprises a pin 28 fixed to the connector body and the first counter bearing surface 29 of the ejecting lever 8 whereas the second fulcrum 25 comprises the second cam surface 26 of the opposing surface of the connector body and the second counter bearing surface 27 of the ejecting lever 8.

Figure 17:
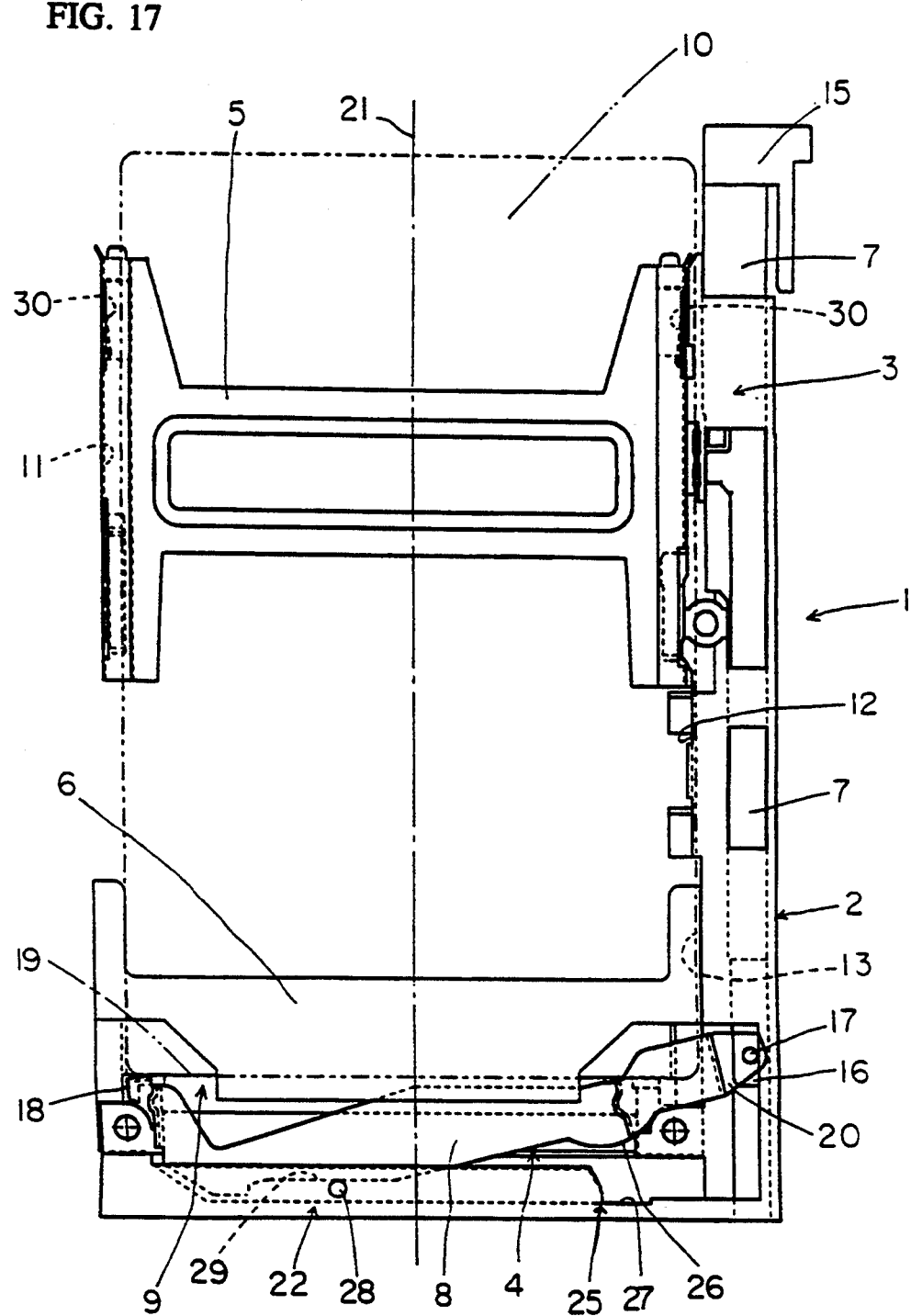
FIG. 17 is a plan view of a card ejecting mechanism according to a sixth embodiment of the invention, showing an IC card inserted in a card connector and connected to the header portion thereof.

FIG. 17 shows a sixth embodiment of the present invention. In this embodiment the first fulcrum 22 comprises a pin 28 fixed to the connector body and the first counter bearing surface 29 of the ejecting lever 8. Whereas the second fulcrum 25 is constituted by the second cam surface 26 of the connector body.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A connector apparatus for providing an interconnection between an IC card and a printed circuit board, said connector apparatus including:
   a connector body defining an IC card passage with an IC card-receiving opening at one end thereof, wherein said IC card is inwardly and outwardly movable within the IC card passage between an inserted position whereat it electrically and mechanically engages the connector apparatus, and an initial ejected position whereat said IC card is at least partially disengaged from the connector apparatus;
   an elongated actuator reciprocally mounted laterally of the IC card passage; and
   an ejector arm rotatable about a first point on the connector body, said ejector arm having a first end pivotally associated with the actuator and a second end which cooperates with the IC card when said card is in the inserted position,
   whereby when said IC card is in the inserted position and the actuator is moved in the direction of insertion of the IC card, the ejector arm pivots about the first point and the second end of the ejector arm moves the IC card to the initial ejected position;
   the improvement in the connector apparatus comprising:
   the ejector arm is rotatable about a second point on the connector body, wherein the ejector arm pivots about the second point after pivoting about the first point, thereby moving the IC card from the initial ejected position to a final ejected position wherein a portion of the IC card extends outside the IC card-receiving opening.

2. The connector apparatus as set forth in claim 1 further comprising a header portion adapted for interconnection of the IC card to electrical traces on the printed circuit board, the header portion defining an array of terminals adapted to electrically engage corresponding terminals on a leading face of the IC card when the IC card is in its inserted position.

3. The connector apparatus as set forth in claim 1 wherein the first point about which the ejector arm is rotatable comprises a first fulcrum defined by a cam surface formed on one of the ejector arm and the connector body and a first counter bearing surface formed on the other of the ejector arm and the connector body.

4. The connector apparatus as set forth in claim 1 wherein the first point about which the ejector arm is rotatable comprises a first fulcrum defined by a pin fixed to one of the ejector arm and the connector body and a first counter bearing surface formed on the other of the ejector arm and the connector body.

5. The connector apparatus as set forth in claim 3 wherein the second point about which the ejector arm is rotatable comprises a second fulcrum defined by a cam surface formed on one of the ejection arm and the connector body and a second counter bearing surface formed on the other of the ejection arm and the connector body.

6. The connector apparatus as set forth in claim 1 wherein the connector body is comprised of a dielectric housing extending substantially entirely the length of the connector apparatus and in which is mounted the terminal array of the header portion of the connector apparatus.

7. The connector apparatus as set forth in claim 6 wherein the dielectric housing and actuator are each unitarily molded of dielectric material.

8. The connector apparatus as set forth in claim 6 wherein the connector body further comprises a card insertion guide for initially guiding the IC card into engagement with the header.

9. The connector apparatus as set forth in claim 8 wherein the insertion guide and the ejector arm are each stamped and formed from sheet metal material.

10. The connector apparatus as set forth in claim 9, wherein the card insertion guide includes a first inwardly projecting spring finger integrally formed on an inner wall of the insertion guide.

11. The connector apparatus as set forth in claim 10 further comprising a second inwardly projecting spring finger integrally formed on an inner wall of the insertion guide, wherein the first and second inwardly projecting spring fingers exert forces against opposite edges of the IC card to bias the IC card toward the center of the IC card passage and to limit the distance the IC card travels upon ejection thereof.

12. The connector apparatus as set forth in claim 11 wherein the inwardly projecting spring fingers function as ground terminals to discharge static electricity from the IC card.

13. A connector apparatus for providing an interconnection between a generally rectangular IC card and a printed circuit board, said connector apparatus defining a longitudinal centerline and including:
   a connector body defining an IC cards passage with a centerline generally coincident with the longitudinal centerline of the connector apparatus, and including a channel positioned laterally of the IC card passage on a first side of the centerline of the connector apparatus, wherein said IC card is inwardly and outwardly movable within the IC card passage between an inserted position whereat it electrically and mechanically engages the connector apparatus, and an initial ejected position whereat said IC card is at least partially disengaged from the connector apparatus;
   an elongated actuator reciprocally mounted within the channel of the connector body; and
   an ejector arm pivotally mounted on the connector body, having a first end pivotally associated with the actuator and a second end which cooperates with the IC card when said card is in the inserted position, wherein said ejector arm is rotatable about a first point located on a second side of the centerline of the connector apparatus,
   whereby when said IC card is in the inserted position and the actuator is moved in the direction of insertion of the IC card, the ejector arm pivots about the first point and the second end of the ejector arm moves the IC card to the initial ejected position;

the improvement in the connector apparatus comprising:

the ejector arm is rotatable about a second point located on the first side of the centerline of the connector apparatus, whereby the ejector arm pivots about the second point after pivoting about the first point to move the IC card from the initial ejected position to a final ejected position wherein a portion of the IC card extends outside the opening.

14. A connector apparatus for providing an interconnection between an IC card and a printed circuit board, said connector apparatus including:

a connector body defining an IC card passage with an IC card-receiving opening at one end thereof, wherein said IC card is inwardly and outwardly movable within the passage of the connector body between an inserted position whereat it electrically and mechanically engages the connector apparatus, and an initial ejected position whereat said IC card is at least partially disengaged from the connector apparatus;

an elongated actuator reciprocally mounted laterally of the IC card passage; and an ejector arm rotatable about a first fulcrum on the connector body, said ejector arm having a first end pivotally associated with the actuator and a second end which cooperates with the IC card when said card is in the inserted position, wherein the distance between the first end of the ejector arm and the first fulcrum is greater than the distance between the second end of the ejector arm and the first fulcrum, whereby when said IC card is in the inserted position and the actuator is moved in the direction of insertion of the IC card, the ejector arm pivots about the first fulcrum and the second end of the ejector arm moves the IC card to the initial ejected position;

the improvement in the connector apparatus comprising:

the ejector arm is rotatable about a second fulcrum on the connector body, wherein the distance between the first end of the ejector arm and the second fulcrum is less than the distance between the second end of the ejector arm and the second fulcrum, whereby the ejector arm pivots about the second fulcrum after pivoting about the first fulcrum to move the IC card from the initial ejected position to a final ejected position wherein a portion of the IC card extends outside the IC card-receiving opening.

15. The connector apparatus as set forth in claim 14 further comprising a header portion adapted for interconnection of the IC card to electrical traces on the printed circuit board, the header portion defining an array of terminals adapted to electrically engage corresponding terminals on a leading face of the IC card when the IC card is in its inserted position.

16. The connector apparatus as set forth in claim 14 wherein the first fulcrum comprises a first cam surface formed on one of the ejector arm and the connector body and a first counter bearing surface formed on the other of the ejector arm and the connector body.

17. The connector apparatus as set forth in claim 14 wherein the first fulcrum comprises a pin fixed to one of the ejector arm and the connector body and a first counter bearing surface formed on the other of the ejector arm and the connector body.

18. The connector apparatus as set forth in claim 16 wherein the second fulcrum about which the ejector arm is rotatable comprises a second cam surface formed on one of the ejection arm and the connector body and a second counter bearing surface formed on the other of the ejection arm and the connector body.

19. The connector apparatus as set forth in claim 14 wherein the connector body is comprised of a dielectric housing extending substantially entirely the length of the connector apparatus and in which is mounted the terminal array of the header portion of the connector apparatus.

20. The connector apparatus as set forth in claim 19 wherein the dielectric housing and actuator are each unitarily molded of dielectric material.

21. The connector apparatus as set forth in claim 19 wherein the connector body further comprises a card insertion guide for initially guiding the IC card into engagement with the header portion.

22. The connector apparatus as set forth in claim 21 wherein the insertion guide and the ejector arm are each stamped and formed from sheet metal material.

23. The connector apparatus as set forth in claim 22, wherein the card insertion guide includes a first inwardly projecting spring finger integrally formed on an inner wall of the insertion guide.

24. The connector apparatus as set forth in claim 23 further comprising a second inwardly projecting spring finger integrally formed on an inner wall of the insertion guide, wherein the first and second inwardly projecting spring fingers exert forces against opposite edges of the IC card to bias the IC card toward the center of the IC card passage and to limit the distance the IC card travels upon ejection.

25. The connector apparatus as set forth in claim 24 wherein the inwardly projecting spring fingers function as ground terminals to discharge static electricity from the IC card.

* * * * *